United States Patent [19]

Olschewski et al.

[11] 4,438,992
[45] Mar. 27, 1984

[54] TWO-PIECE ROLLING BEARING CAGE

[75] Inventors: Armin Olschewski; Klaus Kispert, both of Schweinfurt; Hans Meining, Dittelbrunn, all of Fed. Rep. of Germany

[73] Assignee: SKF Kugellagerfabriken GmbH, Schweinfurt, Fed. Rep. of Germany

[21] Appl. No.: 268,884

[22] Filed: Jun. 1, 1981

[30] Foreign Application Priority Data

Jun. 21, 1980 [DE] Fed. Rep. of Germany .... 8016523[U]

[51] Int. Cl.³ .................. F10C 33/38; F10C 33/46
[52] U.S. Cl. .................... 308/201; 308/217; 308/235
[58] Field of Search ............... 308/201, 217, 218, 235, 308/DIG. 11; 24/208 R, 208 A, 213 R, 213 CS, 214, 216

[56] References Cited

U.S. PATENT DOCUMENTS

| 1,237,201 | 8/1917 | Green | 24/214 |
| 2,845,672 | 8/1958 | Molene | 24/213 R X |
| 2,969,570 | 1/1961 | Petri et al. | 24/214 X |
| 4,054,340 | 10/1977 | Broshkevitch | 308/217 |

FOREIGN PATENT DOCUMENTS

| 649114 | 9/1962 | Canada | 308/201 |
| 1918324 | 10/1970 | Fed. Rep. of Germany | 308/201 |

Primary Examiner—Stuart S. Levy
Assistant Examiner—Thomas R. Hannon
Attorney, Agent, or Firm—Daniel M. Rosen

[57] ABSTRACT

A two-piece rolling bearing cage with cage bridges provided on at least one cage section. The bridges engage in corresponding recesses of the other cage section and connect the two cage sections together. The invention comprises a snap pin at the free end of each cage bridge, each snap pin having a broadened head section and an undercut surface. Each of the recesses accommodates a snap pin which has a corresponding contact surface for mating with the undercut surface. The head section has a front recess means and each recess has a preferably conical projection which, after assembly of the cage sections engages the front recess means of the head section.

4 Claims, 6 Drawing Figures

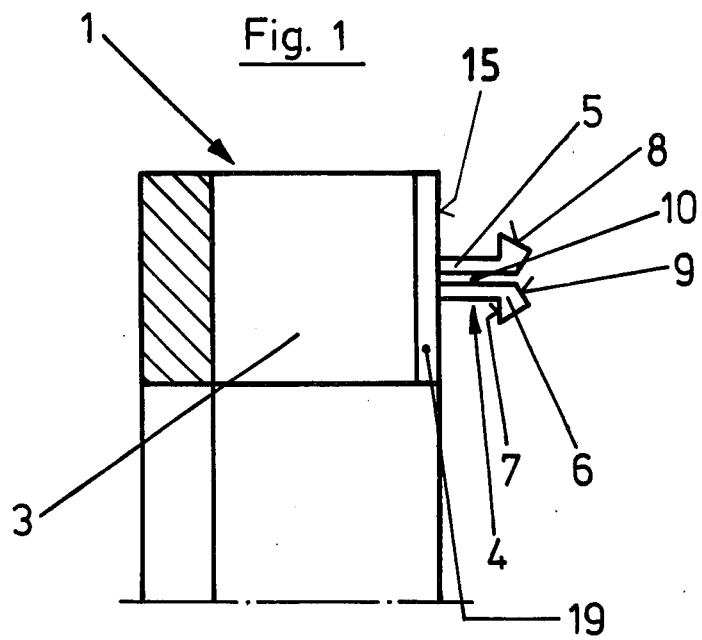
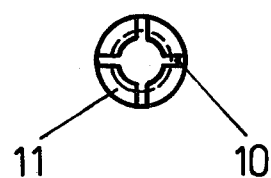

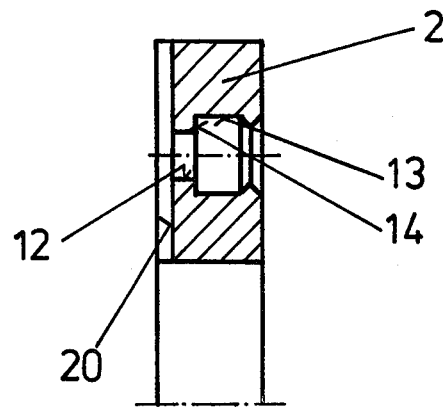
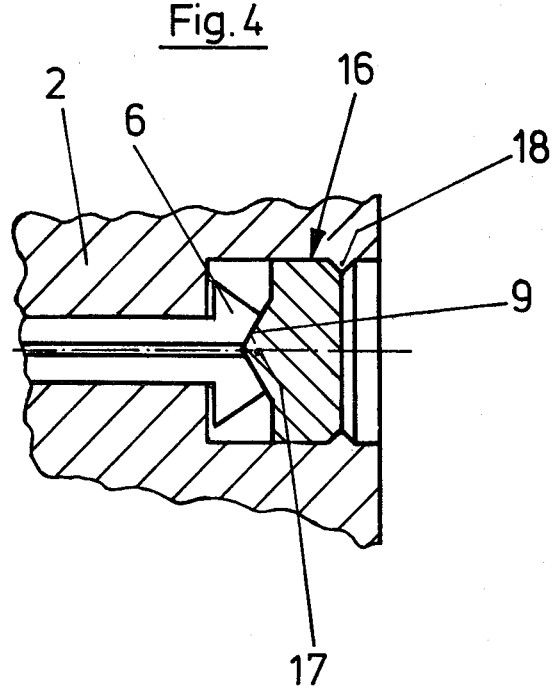

TWO-PIECE ROLLING BEARING CAGE

BACKGROUND OF THE INVENTION

The present invention relates to a bearing cage, and particularly to a two-piece rolling bearing cage with cage bridges provided on one cage section, which bridges engage in corresponding recesses of the other cage section and lockingly connect the two cage sections together.

DESCRIPTION OF THE PRIOR ART

Two-piece rolling bearing cages are known in which longitudinal ridge sections and the lateral side rings are connected together by riveting. Riveting of the cage sections is relatively costly and complex procedure.

It is also known from the German patent OS No. 1,918,324 to hold two halves of synthetic material together by pins which are formed on one cage section and snap into recesses of the other cage section. In this known cage, however, the connection of the cage sections under heavy loads may loosen, thereby giving rise to a dangerous condition.

It is therefore the object of the present invention to provide a two-piece cage construction which may be manufactured simply and inexpensively, as for example by extrusion or molding, and assembled without great labor, and wherein the cage halves are held tightly together, even under heavy loads.

BRIEF DESCRIPTION OF THE PRESENT INVENTION

The foregoing object is accomplished pursuant to the present invention in that each of the cage bridges, at its respective free end, is provided with a snap pin with a broadened head section and an undercut surface which rests against a corresponding contact surface of a recess. The head section has front recess means, and a preferably conical projection is provided which, after assembly of the cage sections, engages in the front recess means of the head section. As a result, the diameter of the head of the snap pin can no longer be reduced after assembly of the cage sections, so that the head sections of the snap pin cannot be drawn out of the bore of one of the cage sections, even under great axial loads.

According to an additional feature of the present invention, the snap pins, starting from one front face, are provided with one or more slots running in an axial direction so that the head sections may be pressed together lightly on introduction into the bores of one of the cage sections. These projections, which run in a preferably radial direction, being arranged at the front sides of the bridges and engaging in corresponding recesses of one cage section, results in a cage structure in which the bridges cannot be displaced or twisted during operation by constant alternation of loading and unloading of the individual rolling members, thereby providing an advantageously safe and secure structure.

The invention explained in greater detail below, by means of the examples, and taken in conjunction with the drawings, in which:

DESCRIPTION OF THE DRAWINGS

FIG. 1 shows the ridged section of the cage pursuant to the present invention with formed-on snap pins, in section, FIG. 2 illustrates a top view of the head of a snap pin, FIG. 3 shows the side ring of the cage before being snapped on the ridged section, in section.

FIG. 4 is a partial section of the cage pursuant to the invention with snapped-on side rings and inserted stopper for securing the snap pin.

DETAILED DESCRIPTION OF THE PRESENT INVENTION

Figure 5:
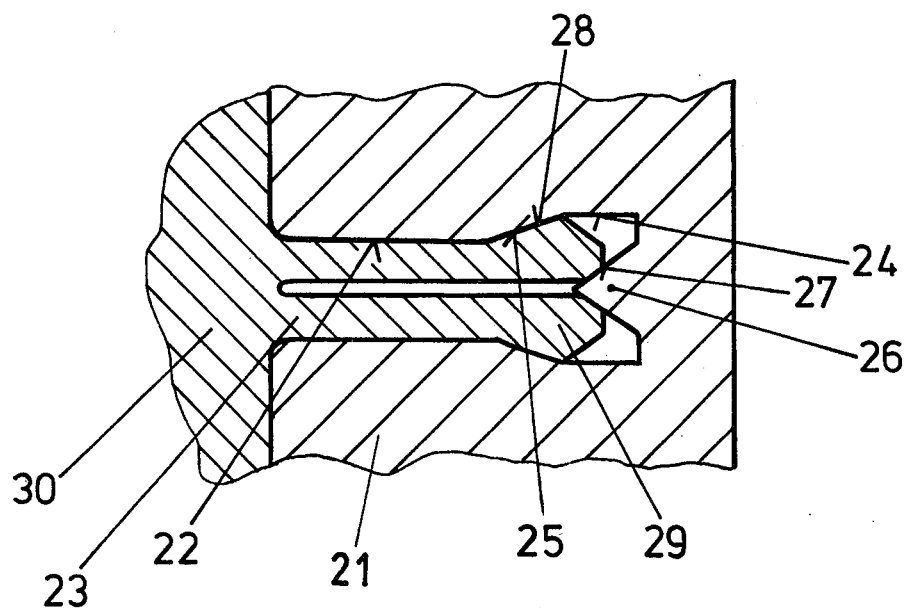
FIG. 5 illustrates a partial section of an assembled cage including the means for securing the snap pin in blind bores of the side ring.

The cage represented in FIGS. 1 to 4 consists of a ridged section 1 provided with pockets for rolling members and a side ring 2, which serves for closing the said pockets. At the free end of the cage bridge 3 there is in each instance provided an axially directed snap pin 4, which consist of a shaft 5 and a head section 6 with an undercut surface 7, running radially. The head section 6 is designed with a conically shaped surface 8, the smallest diameter being arranged on the side turned toward the side ring 2 and having a conical recess 9 at the free end. The snap pin 4 is provided with two slots 10 running axially and arranged crosswise, so that four hook-shaped sections 11 are produced, which may be pressed elastically inward, The side ring 2 has recesses 12, corresponding to the number of snap pins 4, which recesses are enlarged on the side turned away from the ridged section 1. This enlarged recess 13 has a diameter which is greater than the maximum outside diameter of the head section 6 and an offset with a radial contact surface 14. Before assembly of the cage sections 1, 2 the cylinder rollers (not shown) are inserted into the cage pockets and the side ring 2 mounted on the snap pins 4. When the snap pins 4 are pressed into the bores 12 of the side ring 2 the hook-shaped sections 11 of the snap pin 4 are pressed inward, so that the head section 6 is reduced in diameter. As soon as the side ring 2 is shoved completely onto the snap pins and rests against the faces 15 of the bridges 3, the hook-shaped sections 11 of the snap pin 4 spring open and lie against the contact surface 14 of the side ring 2. For securing the head section 6 against unintentional snapping out, there is in each instance arranged in the enlarged recess 13, as shown in FIG. 4, a stopper 16 with a conical projection 17 which engages in the conical recess 9 of the head section 6. The stoppers 16 are fixed by projections 18, which are formed directly on the ring 2 by a suitable work tool. For centering, the bridges 3 are provided, for example at the ends of the bridge, with projections 19, which engage in corresponding recesses 20 of the side ring 2, An additional example of the present invention is represented in FIG. 5. One of the cage sections 21 is provided with blind bores 22 for accommodating the snap pins 23. The bores 22 also have an enlarged section 24. This enlarged bore section 24 has conical side surfaces 25 and in each instance has a formed-on conical projection 26 on the end surface. When the snap pins 23 are shoved into the blind bores 22 of the side ring 21 the conical projection 26 is pressed into the conical depression 27 in the head section of the snap pin 23, whereupon the conical surfaces 28 of the head section 29 are pressed outward against the conical surfaces 25 of the enlarged bore section 24, so that one cage section 21 is joined solidly with the other cage section 30 (shown in partial section only).

Figure 6:
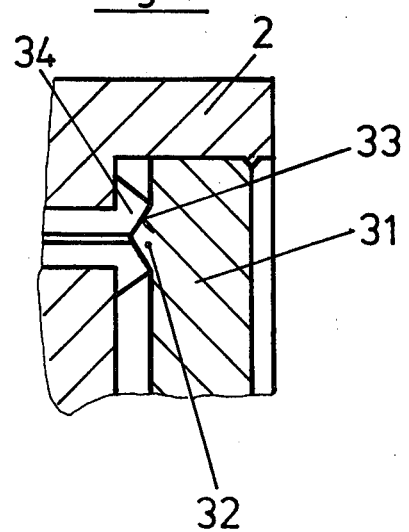
FIG. 6 shows a partial section of an assembled cage with a ring arranged in a bore of the side ring, which cage is provided with means for securing the snap pin.

The embodiment represented in FIG. 6 differs from the embodiment of FIG. 5 only in that instead of the stopper 16 a ring 31 is arranged in a recess of one of the side sections, which ring engages by conical projections 32 in corresponding recesses 33 of the head section 34.

As illustrated in FIGS. 4, 5, and 6, at least a portion of the snap pin adjacent the head section, toward the respective bridge, engages the sides of the recess of the other cage section.

These forms of embodiment described represent only examples of a new two-piece rolling bearing cage pursuant to the present invention. Modifications in the design of the separate components are readily possible within the scope of the present invention. Thus the cage may consist of two ridged sections, each of which in each instance has only every second cage bridge and between each two cage bridges is arranged a recess for accommodating the snap pin. Other modifications will be apparent to those skilled in the art.

What is claimed is:

1. A two-piece rolling bearing cage comprising first and second cage sections, at least one of said cage sections having a plurality of cage bridges terminating in a snap pin, said snap pin comprising an elongated split shaft and an enlarged split protruding tapered conical head, the other of said cage sections having a plurality of recesses each for accommodating a separate said snap pin, said recesses each having a diameter to permit passage of said head when compressed through said split, said conical head having a conical end recess, and a conical projection in each other cage section recess and engaging an end recess of a respective pin to hold the elongated shaft of said pin against the respective elongated passage while holding said enlarged head against a contact surface of said enlarged end of the respective other cage section recess, for holding said cage sections together axially and radially.

2. The two-piece rolling bearing cage of claim 1, wherein two slots are arranged crosswise in said snap pin head.

3. A two-piece rolling bearing cage with cage bridges provided on at least one cage section, and holding means on the ends of said bridges extending into corresponding recesses of the other cage section and holding the two cage sections together axially and radially, the improvement wherein said holding means comprises a snap pin at the free end of each cage bridge, each snap pin having a broadened head section with an undercut surface toward the respective bridge, each of said other cage section recesses accommodating a snap pin having a corresponding contact surface for mating with said undercut surface, said head section having a conical front recess and each other cage section recess having a corresponding conical projection which, after assembly of said cage sections engages said front recess of said head section, wherein a ring is fixed in a ring shaped recess in said other of said cage sections and intersecting said other cage section recesses, said conical projections being formed on said ring and extending into respective conical front recesses of said head section.

4. The two-piece rolling bearing cage of claim 3, wherein two slots are arranged crosswise in the head of said snap pin.

* * * * *